United States Patent
Mahadev et al.

(10) Patent No.: US 7,410,410 B2
(45) Date of Patent: Aug. 12, 2008

(54) METHOD AND APPARATUS TO PRODUCE A GRM LAPPING PLATE WITH FIXED DIAMOND USING ELECTRO-DEPOSITION TECHNIQUES

(75) Inventors: Niraj Mahadev, Milpitas, CA (US); Winston Jose, San Jose, CA (US); Tai Dang, Milpitas, CA (US)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 39 days.

(21) Appl. No.: 11/251,521

(22) Filed: Oct. 13, 2005

(65) Prior Publication Data

US 2007/0084132 A1  Apr. 19, 2007

(51) Int. Cl.
*B24B 1/00* (2006.01)

(52) U.S. Cl. .................. 451/56; 451/443; 451/548; 51/293; 51/295

(58) Field of Classification Search ............. 451/28, 451/56, 443, 548; 125/15; 51/293, 295, 51/297; 257/E23.02
See application file for complete search history.

(56) References Cited

U.S. PATENT DOCUMENTS

| | | | | |
|---|---|---|---|---|
| 3,640,027 A * | 2/1972 | Weiss | ............... | 451/541 |
| 4,037,367 A * | 7/1977 | Kruse | ............... | 451/551 |
| 4,219,004 A * | 8/1980 | Runyon | ............... | 125/15 |
| 4,411,107 A * | 10/1983 | Sekiya et al. | ............... | 451/548 |
| 4,821,461 A | 4/1989 | Holmstrand | ............... | 51/209 |
| 4,866,886 A * | 9/1989 | Holmstrand | ............... | 51/307 |
| 5,899,793 A | 5/1999 | Yanagida et al. | ............... | 451/8 |
| 6,080,043 A | 6/2000 | LeVan | ............... | 451/41 |
| 6,098,609 A * | 8/2000 | Ishizuka | ............... | 125/13.01 |
| 6,370,763 B1 | 4/2002 | Watanuki et al. | ............... | 29/603.09 |
| 6,383,239 B1 | 5/2002 | Suzuki et al. | ............... | 51/307 |
| 6,416,935 B1 | 7/2002 | Hsiao et al. | ............... | 430/320 |
| 6,503,406 B1 | 1/2003 | Hsiao et al. | ............... | 216/22 |
| 6,679,760 B2 | 1/2004 | Fukuroi et al. | ............... | 451/41 |
| 6,712,985 B2 | 3/2004 | Biskeborn | ............... | 216/22 |
| 6,802,761 B1 * | 10/2004 | Beaucage et al. | ............... | 451/28 |
| 6,802,840 B2 | 10/2004 | Chin et al. | ............... | 606/41 |
| 6,804,878 B1 | 10/2004 | Campbell et al. | ............... | 29/603.12 |
| 6,807,722 B2 | 10/2004 | Sasaki et al. | ............... | 29/603.09 |
| 2003/0114094 A1 * | 6/2003 | Myoung et al. | ............... | 451/443 |
| 2004/0077294 A1 * | 4/2004 | Mahadev et al. | ............... | 451/36 |

* cited by examiner

*Primary Examiner*—Eileen P. Morgan
(74) *Attorney, Agent, or Firm*—Kenyon & Kenyon LLP (57) ABSTRACT

A system and method are described for manufacturing a lapping plate. Diamond particles are premixed with a metal matrix. The diamond particles are electro-deposited onto the surface of a lapping plate. The lapping plate may have a substrate of hard metal with a soft metal coating. The metal matrix and the lapping plate may be the same metal. The metal matrix may be tin, copper, nickel, or silver. The metal matrix may be an alloy of tin, copper, nickel, or silver. The diamond particles may be between 0.1 and 0.25 microns in size. Multiple uniform layers of the diamond particles and metal matrix may be stacked on the lapping plate.

11 Claims, 10 Drawing Sheets

METHOD AND APPARATUS TO PRODUCE A GRM LAPPING PLATE WITH FIXED DIAMOND USING ELECTRO-DEPOSITION TECHNIQUES

RELATED APPLICATIONS

This application is related to Ser. No. 10/683,927, filed on Oct. 10, 2003, Inventors: Katherine CHIANG, Winston JOSE, Niraj MAHADEV and Nelson TRUONG, which have been assigned to the present application and are related thereto, are hereby brought to the Examiner's attention. It is respectfully requested that the information be expressly considered during the prosecution of this application. The present invention pertains to a method and apparatus for processing slider devices for hard disk drives and the like. More particularly, the present invention pertains to lapping slider air bearing surfaces, especially for giant magnetoresistive (GMR) type heads.

BACKGROUND OF THE INVENTION

Hard disk drives are common information storage devices having a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow along its surface in a direction substantially parallel to the tangential velocity of the disk. The air flow interacts with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

Figure 1:
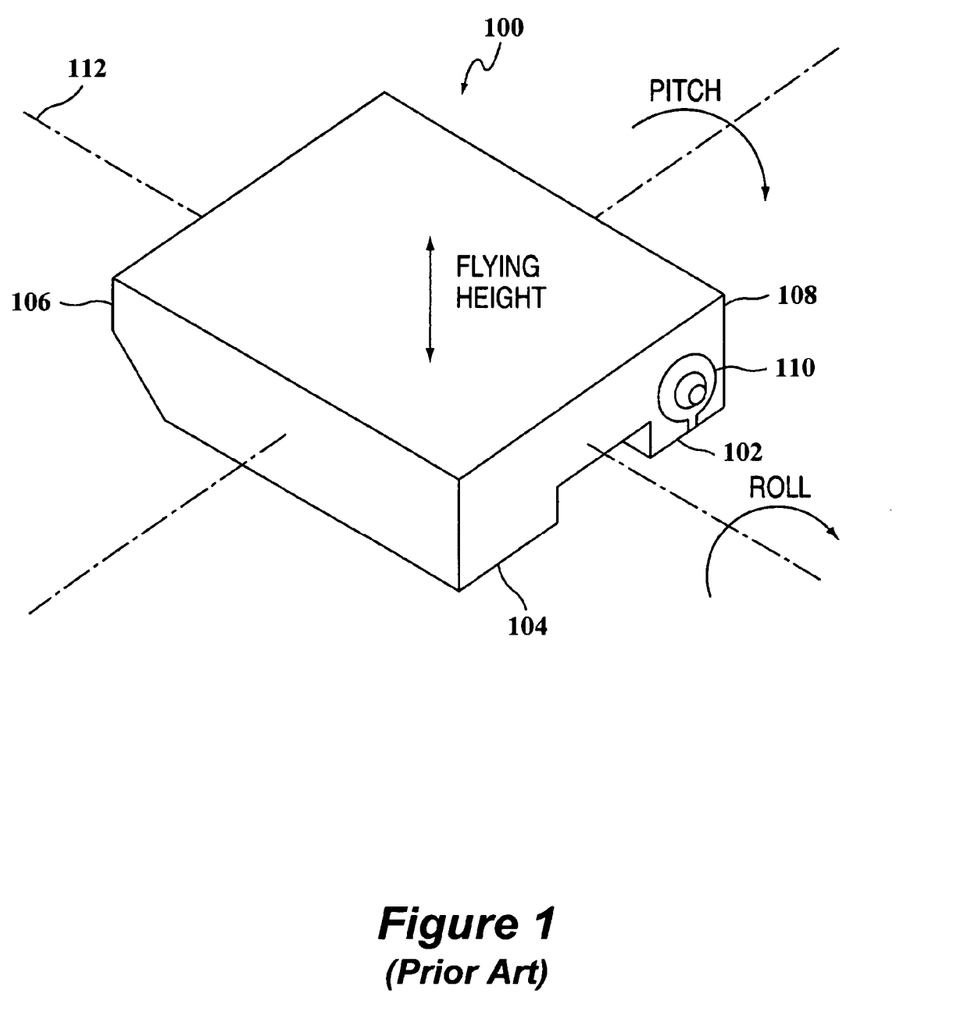
FIG. 1 is a perspective view of a flying slider with a read and write element assembly having a tapered conventional catamaran air bearing slider configuration.

As shown in FIG. 1 an ABS design known for a common catamaran slider 100 may be formed with a pair of parallel rails 102 and 104 that extend along the outer edges of the slider surface facing the disk. Other ABS configurations including three or more additional rails, with various surface areas and geometries, have also been developed. The two rails 102 and 104 typically run along at least a portion of the slider body length from the leading edge 106 to the trailing edge 108. The leading edge 106 is defined as the edge of the slider that the rotating disk passes before running the length of the slider 100 towards a trailing edge 108. As shown, the leading edge 106 may be tapered despite the large undesirable tolerance typically associated with this machining process. The transducer or magnetic element 110 is typically mounted at some location along the trailing edge 108 of the slider as shown in FIG. 1. The rails 102 and 104 form an air bearing surface on which the slider flies, and provide the necessary lift upon contact with the air flow created by the spinning disk. As the disk rotates, the generated wind or air flow runs along underneath, and in between, the catamaran slider rails 102 and 104. As the air flow passes beneath the rails 102 and 104, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 102 and 104, the large surface area of the slider body 100 would produce an excessively large air bearing surface area. In general, as the air bearing surface area increases, the amount of lift created is also increased.

Figure 2:
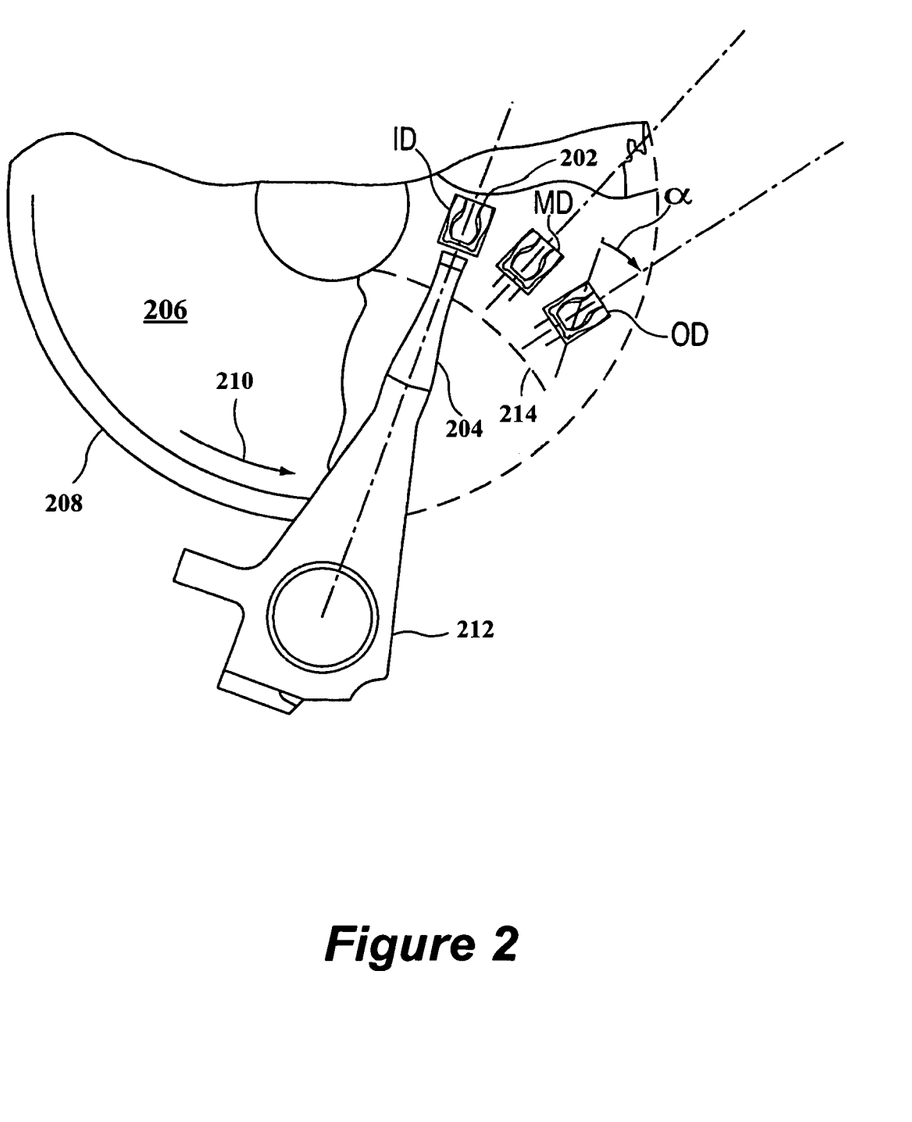
FIG. 2 is a plan view of a mounted air bearing slider over a moving magnetic storage medium.

As illustrated in FIG. 2, a head gimbal assembly 202 often provides the slider with multiple degrees of freedom such as vertical spacing, or pitch angle and roll angle which describe the flying height of the slider. As shown in FIG. 2, a suspension 204 holds the HGA 202 over the moving disk 206 (having edge 208) and moving in the direction indicated by arrow 210. In operation of the disk drive, as shown in FIG. 2, an actuator 212 moves the HGA over various diameters of the disk 206 (e.g., inner diameter (ID), middle diameter (MD) and outer diameter (OD)) over arc 214.

The lapping process pre-defines the ABS on a slider during slider fabrication. With the increase in the disk-drive capacity, the current requirements of the ABS, such as surface finish and the reduction of smearing, scratching, and pitting, have become even more demanding. Since this surface flies over the magnetic media during the drive operation, it has to be de-voided of all the above mentioned problems which are typically related to lapping.

The ABS surface also affects the pole-tip-recession (PTR) of the slider. This parameter defines a portion of the magnetic spacing in the disk, requiring keeping the PTR at a minimum and consistent value during the process. The PTR of the slider is a direct result of the quality of the lapping process parameters, such as slurry type, size, shape, lapping plate, pressure, etc. The effect from each lapping process parameter to the PTR and surface finish is difficult to quantify experimentally.

Figure 3:
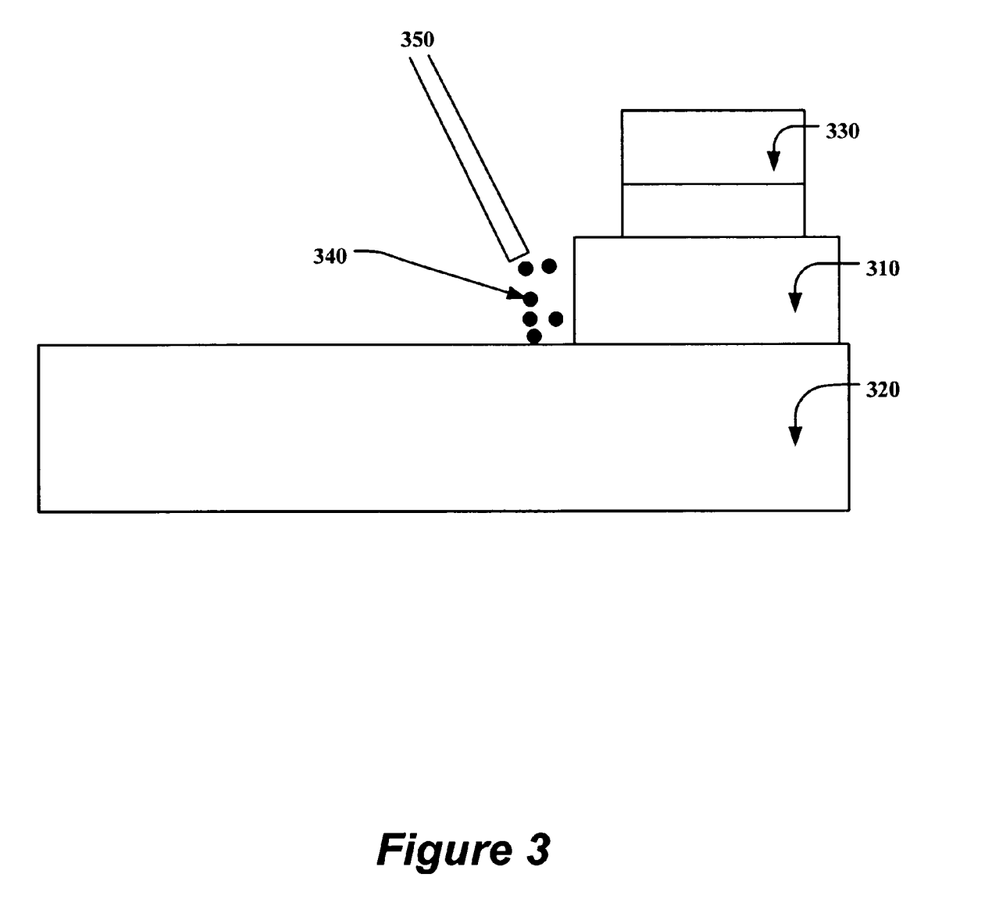
FIG. 3 shows one embodiment of a system 300 for performing the soft lap.

Conventionally, lapping has been performed using diamond slurry on a soft lap, which is typically an alloy of tin-bismuth or tin-antimony. FIG. 3 shows one embodiment of a system 300 for performing the soft lap. A charging ring 310 may be used to charge the lapping plate 320 as weights 330 apply pressure. The lapping plate could be textured using various techniques. During charging, diamond slurry 340 is added to the lapping plate 320 from a slurry feed 350. The size, shape, and distribution of diamond slurry can be specific to the user. Not only does this plate have to impart defect free surface finish to the resulting head but it also has to have a long lasting plate life.

Figure 4:
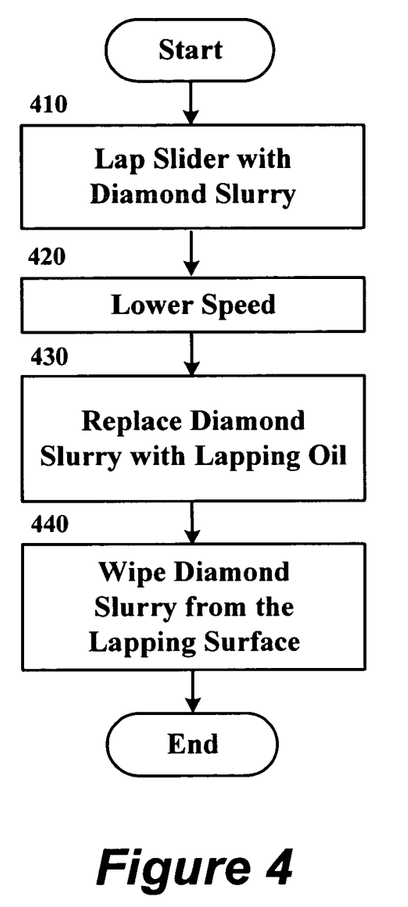
FIG. 4 shows in a flowchart one embodiment of a typical lapping process.

A typical lapping process is shown in the flowchart of FIG. 4. The free-diamond slurry is introduced into the lapping process, with the floating slurry the main mechanism for increased removal rates (Block 410). The speed is lowered (Block 420). The floating diamond slurry is replaced with lapping oil (Block 430). The cutting mechanism is now dominated by the pre-charged lap since the floating diamond slurry is wiped off from the lapping interface (Block 440). Hence, the PTR and surface finish now become a function of the pre-charged diamond, lubricant, lapping pressure and the lapping plate. The pre-charged plate should retain the diamonds for an enhance plate life. In course of time, the diamonds may come out of the plate and start changing the surface characteristics of the final slider.

With the demand of smoother and scratch free surfaces, the industry is driving towards using small diamond sizes in the range of 0.1 microns or lower. A softer lap poses problems such as diamond pull out and the ability to maintain a flat surface during lapping, which could potentially result in loss of geometry control, scratching, and non-uniform pressure on the row bar. Also, getting rid of the floating diamond slurry during the polishing cycle is difficult to achieve practically.

DETAILED DESCRIPTION

A system and method are described for manufacturing a lapping plate. Diamond particles are premixed with a metal matrix. The diamond particles are electro-deposited onto the surface of a lapping plate. The lapping plate may have a substrate of hard metal with a soft metal coating. The metal matrix and the lapping plate may be the same metal. The metal matrix may be tin, copper, nickel, or silver. The metal matrix may be an alloy of tin, copper, nickel, or silver. The diamond particles may be between 0.1 and 0.25 microns in size. Multiple uniform layers of the diamond particles and metal matrix may be stacked on the lapping plate.

Figures 5A, 5B:
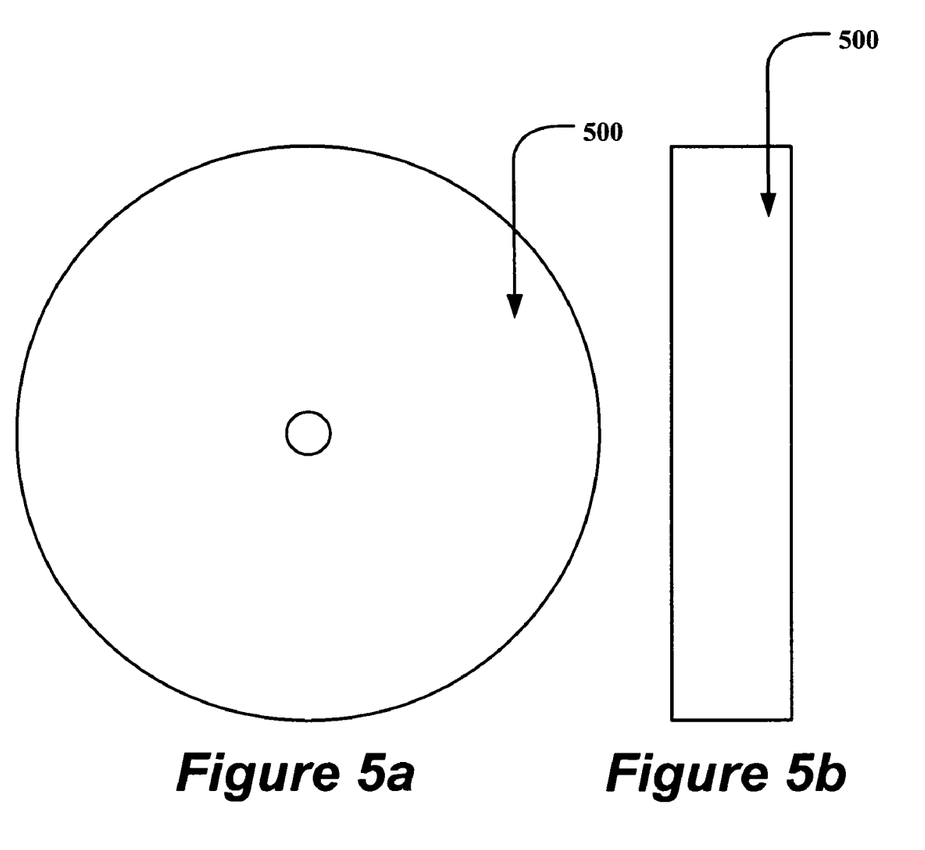
FIGS. 5a-b show one embodiment of a lapping plate.

FIG. 5a shows in a front view and FIG. 5b shows in a side view one embodiment of a lapping plate 500. A substrate material may be chosen based on ductility, which provides the cushion required during lapping to enhance the surface finish quality. A steel substrate material may be used to form the base of the lapping plate to maintain flatness and smoothness during the entire lapping process. The pre-charged plate 500 may accommodate very small diamond in the range of 0.01 and smaller. Electro-deposition of diamonds may be applied to a lapping surface to provide fixed abrasive lapping plates for giant magnetoresistive (GMR) lapping. The plate 500 may be built on a rigid base with very well controlled flatness (e.g. less than 1 micron) and smoothness.

Figure 6A:
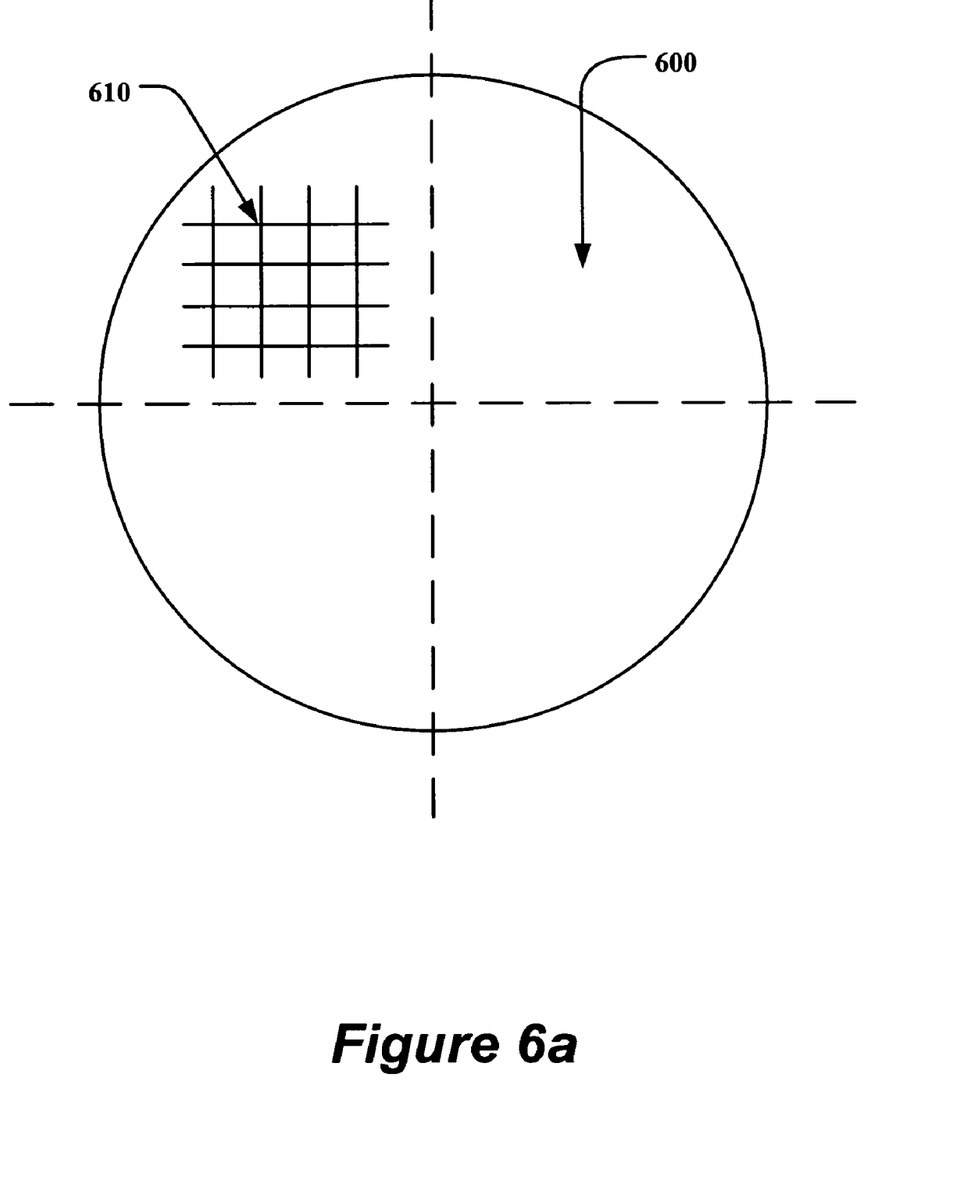
FIGS. 6a-b show one embodiment of a textured lapping plate and a textured surface of a lapping plate.
Figure 6B:
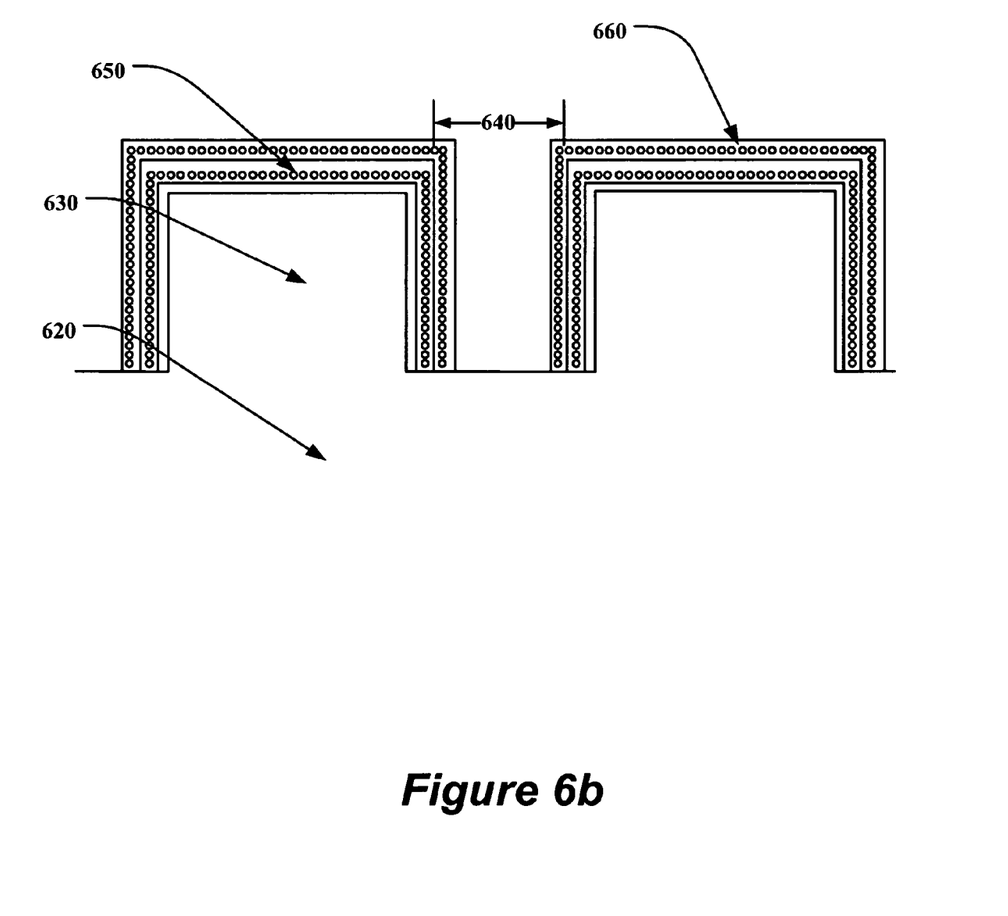

FIG. 6a shows one embodiment of a textured plate 600. The plate 600 may be textured 610 using the facing machine. The type of texture 610 applied to this surface may be suitable to individual requirements. FIG. 6b shows one embodiment of the surface of a textured plate 600. The lapping plate may be a stainless steel substrate 620 approximately 16" in diameter. The texture 620 may be a simple mesh with a land 630 of 300 by 300 microns, a groove depth of 50 microns, and a groove 640 width of the 150 microns. The land 630 may be coated with a nickel-phosporous coating 650. Irrespective of the technique involved in texturing the plate, a pre-fixed diamond surface may be obtained for lapping of GMR bars. A stack of multiple layers 660 of uniform mono-layer coating diamonds may be used.

Figure 7:
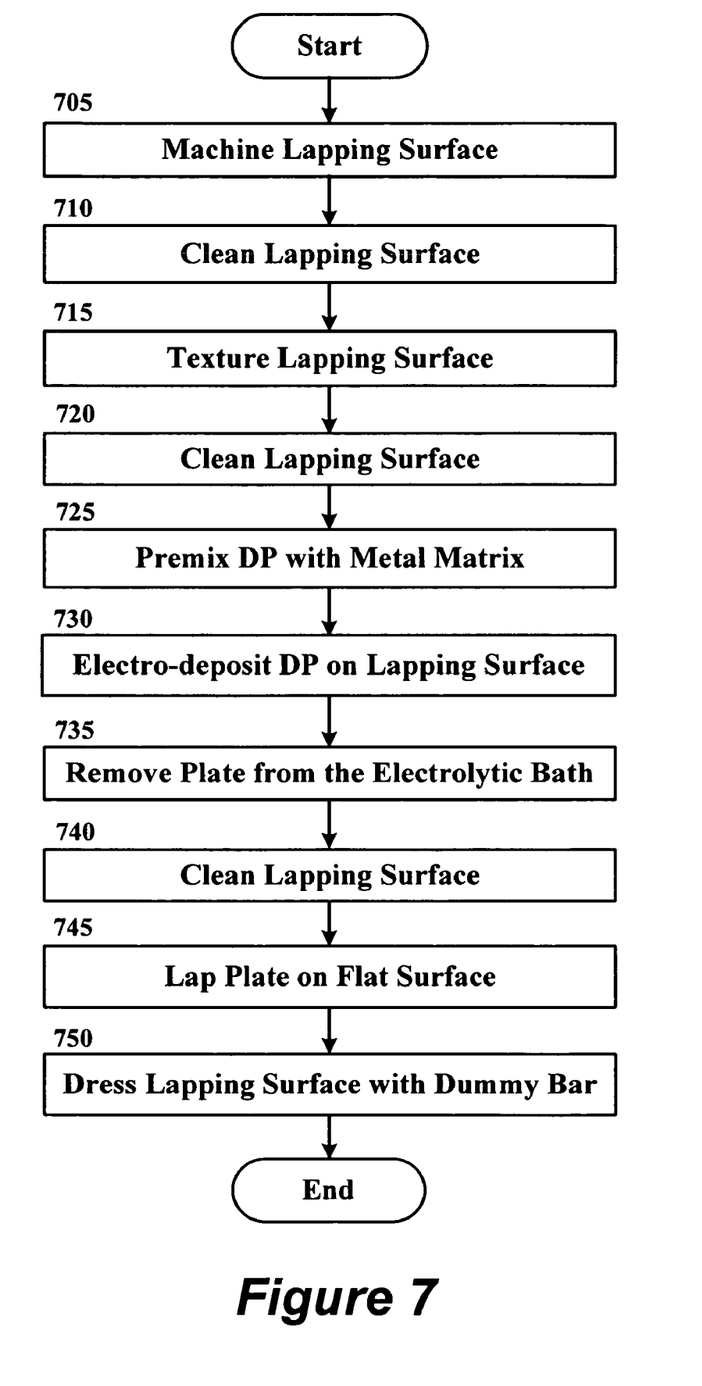
FIG. 7 shows in a flowchart one embodiment of a lapping process.

FIG. 7 shows in a flowchart one embodiment of a lapping process. The lapping surface may be machined to a desired degree of flatness, such as less than 1 microns (Block 705). The surface may be cleaned using standard chemicals and solvent to ensure a chip-free surface (Block 710). The surface of the lapping plate 600 may be textured (Block 715). In one embodiment, a diamond wheel may be used to texture the surface of the lapping plate. The texture provided on the plate may facilitate the easy removal of the material and slurry during lapping of the sliders.

Figure 8:
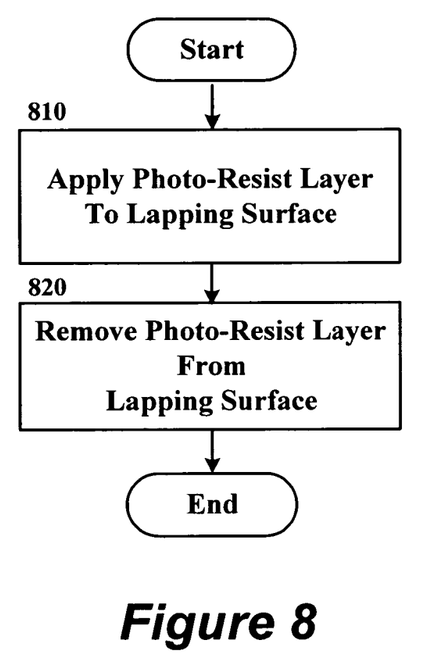
FIG. 8 shows in a flowchart one embodiment of a photo-lithographic process for applying the texture to the lapping surface.

Various other techniques could also be used to texture the plates such as photo-lithography. FIG. 8 shows in a flowchart one embodiment of a photolithographic process for applying the texture 620 to the lapping surface. A photo-resist layer is applied to the lapping surface (Block 810). The photo-resist layer is then selectively removed from the lapping surface to create a specific texture pattern (Block 820).

Continuing the process shown in FIG. 7, the lapping plate 600 may be pre-cleaned (Block 720). Diamond particles may be premixed with a metal-matrix (Block 725). The metal matrix may be a Nickel-Phosphorous bath. The diamond particles may be electro-deposited onto the lapping surface (Block 730). The amount of deposition of the metal-diamond mix may vary depending upon the strength of adhesion required. The mean size of the diamond abrasive may be around 250 nm. The abrasive size may be reduced to at least 100 nm without compromising the quality of the coating. The quality of the coatings to be used for the abrasive surface may be the result of the concentration and uniformity of the diamond distribution on the surface of the lapping plate. These parameters may be optimized depending upon the size of the abrasives to be coated. The uniformity of the diamond distribution in the electro-deposition process may be achieved by optimizing such factors as the plate rotation speed, slurry bath concentration, temperature and choosing a tight distribution of abrasive particle distribution. The plates may be removed from the bath (Block 735). The plates may be cleaned to remove any clumps of nickel (Block 740). The plate may be lapped on a flat surface to remove any irregular coating of the nickel matrix (Block 745). Prior to using these plates for lapping GMR bars, the diamond may be exposed from the matrix by dressing the plate with dummy AlTiC bars or any other appropriate materials (Block 750).

Figure 9:
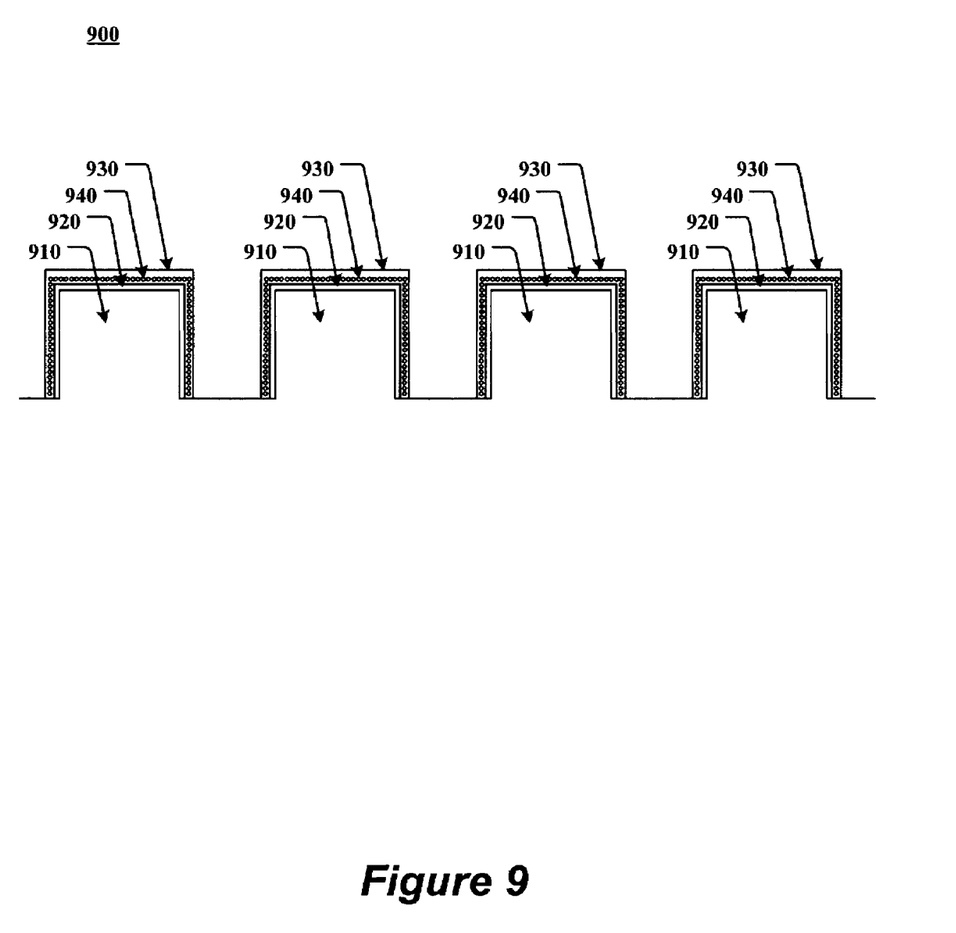
FIG. 9 shows one embodiment of a lapping plate according to the present invention.

FIG. 9 shows one embodiment of a lapping plate 900. A substrate of hard metal 910 may be covered with a coating of soft metal 920. Soft matrices 930, such as tin, copper, nickel, silver baths or alloys, may be mixed with the diamond particles 940 and applied to the soft coating 920. The soft coating 920 and the soft matrices 930 may be of the same material.

Figure 10:
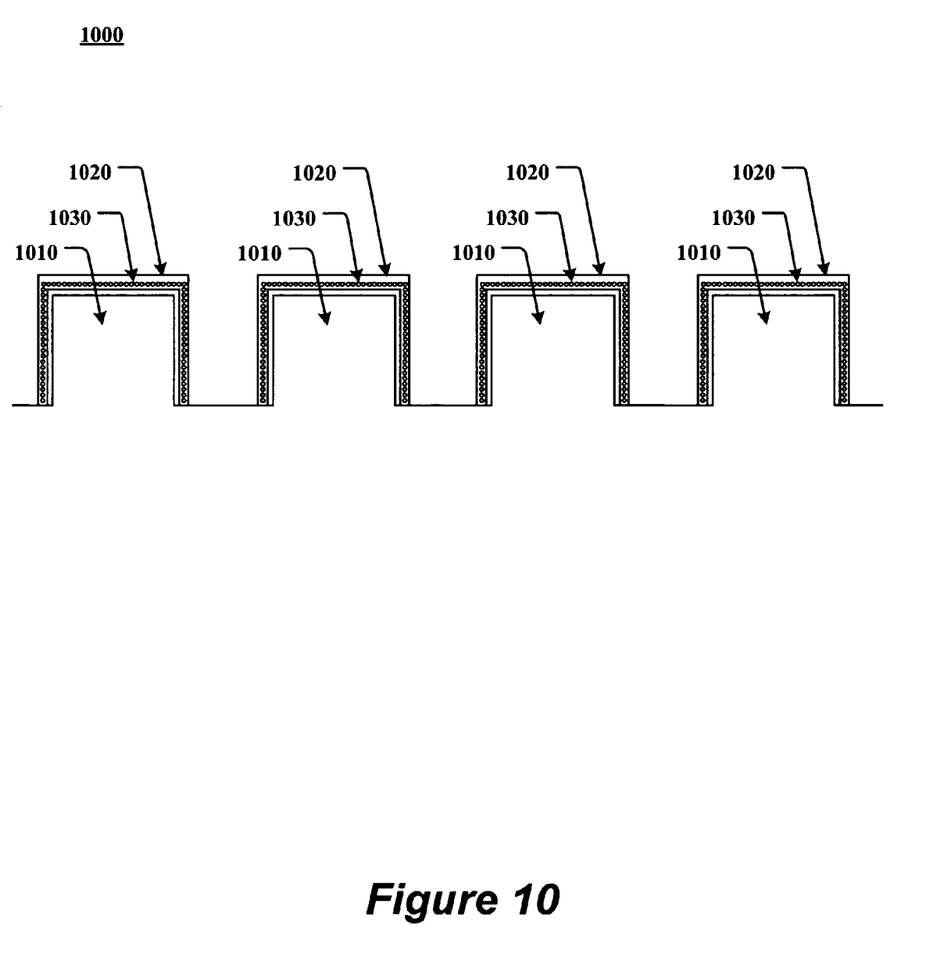
FIG. 10 shows an alternate embodiment of a lapping plate according to the present invention.

FIG. 10 shows an alternate embodiment of a lapping plate 1000. A substrate of a soft metal 1010 may be of the same soft metal as a soft metal matrix 1020. Soft matrices 1020, such as tin, copper, nickel, silver baths or alloys, may be mixed with the diamond particles 1030 and applied to the soft metal substrate 1010.

The results of this process are displayed in Table 1. The cutting rates obtained are very high mostly due to the abrasive particle mean size. The experiments can further be tuned to our specific process requirements with optimization.

| Plate Speed | Lapping Rate (Microns/Min) |
| --- | --- |
| .5 | 1.7 |
| 10 | 5 |

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of principles and variables. Various modifications in form and detail of the disclosed apparatus as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

What is claimed is:

1. A method, comprising:
   machining and cleaning a surface of a lapping plate;
   texturing the surface of the lapping plate, after said machining and cleaning, wherein said texturing includes:
      applying a photoresist layer to the surface of the metal plate; and
      selectively removing the photoresist layer from the surface of the metal plate premixing diamond particles with a metal matrix after said texturing;
   electro-depositing the diamond particles onto the surface of a lapping plate after said premixing;
   lapping the lapping plate on a matrix surface after said electro-depositing; and
   dressing the lapping plate with a bar after said lapping.

2. The method of claim 1, wherein the lapping plate is a hard metal substrate with a soft metal coating.

3. The method of claim 1, further comprising using one type of metal to form the metal matrix and the lapping plate.

4. The method of claim 1, further comprising using a metal that is one of tin, copper, nickel, or silver to form the metal matrix.

5. The method of claim 1, further comprising using an alloy of one of tin, copper, nickel, or silver to form the metal matrix.

6. The method of claim 1, wherein the diamond particles are between 0.1 and 0.25 microns in size.

7. The method of claim 1, further comprising stacking multiple uniform layers of the diamond particles and metal matrix on the lapping plate.

8. The method of claim 1, wherein the lapping plate comprises a substrate to support the lapping plate, and wherein the substrate is a hard metal.

9. The method of claim 8, further comprising a soft metal coating between the substrate and the metal matrix.

10. The method of claim 1, wherein the lapping plate comprises a substrate to support the lapping plate, and wherein the substrate is a soft metal.

11. The method of claim 1, wherein the lapping plate comprises a substrate to support the lapping plate, and wherein one type of metal forms the metal matrix and the substrate.

* * * * *